United States Patent
Kurabayashi

(10) Patent No.: US 11,321,925 B2
(45) Date of Patent: May 3, 2022

(54) MIXED-REALITY SYSTEM, PROGRAM, METHOD, AND PORTABLE TERMINAL DEVICE

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/943,444

(22) Filed: Jul. 30, 2020

(65) Prior Publication Data

US 2020/0357188 A1  Nov. 12, 2020

Related U.S. Application Data

(63) Continuation of application No. PCT/JP2019/003680, filed on Feb. 1, 2019.

(30) Foreign Application Priority Data

Feb. 1, 2018  (JP) .............................. JP2018-016562

(51) Int. Cl.
*G06T 19/00* (2011.01)
*G06T 7/70* (2017.01)
(Continued)

(52) U.S. Cl.
CPC ........ *G06T 19/006* (2013.01); *G06K 7/10564* (2013.01); *G06K 7/1417* (2013.01);
(Continued)

(58) Field of Classification Search
CPC .................................................. G06T 19/006
(Continued)

(56) References Cited

U.S. PATENT DOCUMENTS

2009/0319175 A1* 12/2009 Khosravy .............. G01C 21/20
  701/467
2009/0319181 A1* 12/2009 Khosravy ............. G06F 1/1694
  701/532

(Continued)

FOREIGN PATENT DOCUMENTS

JP  6088094 B1  3/2017

OTHER PUBLICATIONS

International Search Report issued in Application No. PCT/JP2019/003680, dated Apr. 23, 2019 (3 pages).
(Continued)

*Primary Examiner* — Javid A Amini
(74) *Attorney, Agent, or Firm* — Osha Bergman Watanabe & Burton LLP

(57) ABSTRACT

The present invention is a mixed-reality system including a server and a portable terminal device, the portable terminal device having a display for displaying a virtual object to a user present in a predetermined real space and having a photographing device that photographs the real space, the mixed-reality system serving to display, on the display, a mixed-reality image in which the virtual object is superimposed on a photographed image of the real space, wherein, at each of one or more predefined positions on a real object present in the predetermined space, an MR marker constituted of an identification code containing position information corresponding to that position and an alignment marker having a polygonal shape is disposed. The server includes a virtual-space-data storage unit and an application storage unit, and the portable terminal device includes a browser unit, a marker recognition unit, a position determination unit, and an image generation unit.

17 Claims, 9 Drawing Sheets

(51) Int. Cl.
*G06T 17/20* (2006.01)
*G06K 19/06* (2006.01)
*G06K 7/10* (2006.01)
*G06K 7/14* (2006.01)

(52) U.S. Cl.
CPC .......... *G06K 19/06037* (2013.01); *G06T 7/70* (2017.01); *G06T 17/20* (2013.01); *G06T 2207/30204* (2013.01)

(58) Field of Classification Search
USPC .......................................................... 345/419
See application file for complete search history.

(56) References Cited

U.S. PATENT DOCUMENTS

| | | | | |
|---|---|---|---|---|
| 2012/0194517 A1* | 8/2012 | Izadi | ................ | G06T 7/20 345/420 |
| 2013/0135315 A1* | 5/2013 | Bares | ................ | G11B 27/031 345/473 |
| 2013/0141421 A1* | 6/2013 | Mount | ................ | G02B 27/0172 345/419 |
| 2013/0271625 A1* | 10/2013 | Gruber | ................ | G06T 15/506 348/239 |
| 2014/0043436 A1* | 2/2014 | Bell | ................ | H04N 13/204 348/46 |
| 2014/0160235 A1* | 6/2014 | Norland | ................ | H04N 7/181 348/37 |
| 2014/0292653 A1* | 10/2014 | Kamba | ................ | G02B 27/017 345/157 |
| 2015/0168729 A1* | 6/2015 | Kobayashi | ................ | G06F 3/012 345/156 |
| 2016/0210787 A1* | 7/2016 | Chu | ................ | G06T 19/006 |
| 2016/0269675 A1* | 9/2016 | Tsujimoto | ................ | G11B 27/3009 |
| 2017/0034586 A1* | 2/2017 | Melchner | ................ | H04N 21/44008 |
| 2017/0180712 A1* | 6/2017 | Ohashi | ................ | G06T 15/205 |
| 2017/0193679 A1* | 7/2017 | Wu | ................ | G06T 19/00 |
| 2019/0026589 A1* | 1/2019 | Sugihara | ................ | G06K 9/3241 |
| 2019/0147658 A1 | 5/2019 | Kurabayashi | | |
| 2019/0217202 A1* | 7/2019 | Komori | ................ | A63F 13/65 |
| 2019/0342632 A1* | 11/2019 | DeFaria | ................ | G06T 15/205 |
| 2020/0133615 A1* | 4/2020 | Kim | ................ | G06F 3/04847 |
| 2021/0165220 A1* | 6/2021 | Nakada | ................ | G09G 5/38 |

OTHER PUBLICATIONS

Written Opinion issued in International Application No. PCT/JP2019/003680, dated Apr. 23, 2019 (4 pages).

* cited by examiner

MIXED-REALITY SYSTEM, PROGRAM, METHOD, AND PORTABLE TERMINAL DEVICE

TECHNICAL FIELD

The present invention relates to a mixed-reality system, etc., and relates in particular to a mixed-reality system, etc. that makes it possible for a user present in a predetermined real space to experience a sense of mixed reality.

BACKGROUND ART

Recently, technology for fusing the real world and a virtual world seamlessly in real time, or so-called MR (Mixed Reality) technology, is known. MR technology makes it possible for a user experiencing it to experience a sensation as if a virtual object is present at that place. Regarding MR technology, technologies for accurately running MR, such as displaying an object in a virtual space without causing the user to perceive unnaturalness, have been developed. For example, Patent Literature 1 discloses a system that can recognize a real space environment in a mixed-reality environment in real time.

CITATION LIST

Patent Literature

{PTL 1}
  Publication of Japanese Patent No. 6088094

SUMMARY OF INVENTION

Technical Problem

However, for a user to start an MR experience, for example, it has been necessary to install a special app on a smartphone. Furthermore, in order to allow the user to download such a special app in accordance with a certain place, it is necessary to make wideband wireless communication available in that place and to encourage the user to install an app, and this has been hindering practical operation.

The present invention has been made in order to solve the problem described above, and it is a chief object thereof to provide a mixed-reality system, etc. that make it possible for a user to more readily experience MR in accordance with the place where the user is.

Solution to Problem

In order to achieve the above object, a mixed-reality system according to an aspect of the present invention is a mixed-reality system including a server and a portable terminal device, the portable terminal device having a display for displaying a virtual object to a user present in a predetermined real space and also having a photographing device that photographs the real space, the mixed-reality system serving to display, on the display, a mixed-reality image in which the virtual object is superimposed on a photographed image of the real space. The mixed-reality system is characterized in that, at each of one or more predefined positions on a real object present in the predetermined space, an MR marker constituted of an identification code containing position information corresponding to that position and an alignment marker having a polygonal shape is disposed. The server includes: a virtual-space-data storage unit that stores virtual space data including three-dimensional space data of the real object present in the predetermined real space, the three-dimensional data being obtained in advance and constituted of three-dimensional shape elements each having three-dimensional position information in a virtual space, and also including virtual object data disposed in the virtual space; and an application storage unit that stores a Web application identified on the basis of an identifier included in the identification code, the Web application providing a mixed-reality-image displaying webpage, the mixed-reality-image displaying webpage causing the photographing device to be activated when loaded by the portable terminal device and including a display area of a mixed-reality image based on the photographed image of the real space photographed by the photographing device. The portable terminal device includes: a browser unit that accesses the identifier included in the identification code to display the mixed-reality-image displaying webpage provided by the Web application; a marker recognition unit that recognizes the alignment marker constituting the MR marker in the case where the Web application is activated, the MR marker is photographed by the photographing device, and the identification code is recognized; a position determination unit that determines a viewpoint position of a virtual camera in the virtual space corresponding to the position and photographing direction of the photographing device in the real space on the basis of the position information contained in the identifier accessed by the browser unit as well as a positional relationship between the portable terminal device and the alignment marker recognized by the marker recognition unit, the positional relationship being determined from the shape and size of the alignment marker; and an image generation unit that generates a mixed-reality image in which the virtual object is superimposed on the photographed image of the real space, which is to be displayed in the display area of the mixed-reality-image displaying webpage, on the basis of the virtual space data and the viewpoint position of the virtual camera.

Furthermore, in the present invention, preferably, the portable terminal device includes an identification-code recognition unit that recognizes the identification code in the case where the MR marker is photographed by the photographing device, and the browser unit accesses the identifier included in the identification code recognized by the identification-code recognition unit to display the mixed-reality-image displaying webpage provided by the Web application.

Furthermore, in the present invention, preferably, the virtual-space-data storage unit stores the virtual space data corresponding to each of the identifiers included in the identification codes, the browser unit obtains the virtual space data corresponding to the accessed identifier from the virtual-space-data storage unit, and the image generation unit generates a mixed-reality image as viewed from the viewpoint position of the virtual camera by using the virtual space data obtained from the virtual-space-data storage unit.

Furthermore, in the present invention, preferably, the portable terminal device further includes an identifier checking unit that checks whether or not the identifier included in the identification code recognized as a result of the activation of the Web application is the same as the identifier accessed by the browser unit, and the marker recognition unit recognizes the alignment marker in the case where it is determined by the identifier checking unit that these identifiers are the same.

Furthermore, in the present invention, preferably, in the case where it is determined by the identifier checking unit that the identifiers are not the same, the browser unit accesses another identifier included in the identification code recognized as a result of the activation of the Web application, obtains the virtual space data corresponding to the other identifier from the virtual-space-data storage unit, and displays the mixed-reality-image displaying page instead of performing reloading, and the marker recognition unit recognizes the alignment marker constituting the MR marker together with the identification code including the other identifier.

Furthermore, in the present invention, preferably, the identifier is a URL.

Furthermore, in the present invention, preferably, the three-dimensional shape elements are meshes each constituted of a polygon or polygons.

Furthermore, in the present invention, preferably, the identification code is a QR code (registered trademark) or a data matrix.

Furthermore, in the present invention, preferably, wherein the alignment marker has a square shape.

Furthermore, in the present invention, preferably, the alignment marker is disposed along an edge of the identification code.

Furthermore, in the present invention, preferably, the marker recognition unit recognizes the alignment marker by painting and erasing the identification code with a predefined color.

Furthermore, in the present invention, preferably, the alignment marker is disposed in proximity to the identification code at a position having a predetermined positional relationship with the identification code.

Furthermore, in the present invention, preferably, the portable terminal device is configured so as to be able to send, to the server, each of the photographed image of the real space photographed by the photographing device and image data of the virtual object, constituting the mixed-reality image generated by the image generation unit, so that another terminal device can obtain the mixed-reality image.

Furthermore, in order to achieve the above object, a program according to an aspect of the present invention is a program for a mixed-reality system including a portable terminal device having a display for displaying a virtual object to a user present in a predetermined real space and also having a photographing device that photographs the real space, the mixed-reality system serving to display, on the display, a mixed-reality image in which the virtual object is superimposed on a photographed image of the real space. The program is characterized in that: in the system, at each of one or more predefined positions on a real object present in the predetermined space, an MR marker constituted of an identification code containing position information corresponding to that position and an alignment marker having a polygonal shape is disposed, and virtual space data including three-dimensional space data of the real object present in the predetermined real space, the three-dimensional data being obtained in advance and constituted of three-dimensional shape elements each having three-dimensional position information in a virtual space, and also including virtual object data disposed in the virtual space, as well as a Web application identified on the basis of an identifier included in the identification code, are stored, the Web application provides a mixed-reality-image displaying webpage, and the mixed-reality-image displaying webpage causes the photographing device to be activated when loaded by the portable terminal device and includes a display area of a mixed-reality image based on the photographed image of the real space photographed by the photographing device. The program causes the portable terminal device to execute: a step of recognizing the identification code in the case where the photographing device is activated and the MR marker is photographed by the photographing device, thereby activating a browser and accessing the identifier included in the recognized identification code to display the mixed-reality-image displaying webpage; a step of recognizing the alignment marker constituting the MR marker in the case where the Web application is activated, the MR marker is photographed by the photographing device, and the identification code is recognized; a step of determining a viewpoint position of a virtual camera in the virtual space corresponding to the position and photographing direction of the photographing device in the real space on the basis of a positional relationship between the portable terminal device and the recognized alignment marker, the positional relationship being determined from the shape and size of the alignment marker, as well as position information contained in the identifier included in the identification code; and a step of generating a mixed-reality image in which the virtual object is superimposed on the photographed image of the real space, which is to be displayed in the display area of the mixed-reality-image displaying webpage, on the basis of the virtual space data and the viewpoint position of the virtual camera.

Furthermore, in order to achieve the above object, a method according to an aspect of the present invention is a method that is executed by a mixed-reality system including a portable terminal device having a display for displaying a virtual object to a user present in a predetermined real space and also having a photographing device that photographs the real space, the mixed-reality system serving to display, on the display, a mixed-reality image in which the virtual object is superimposed on a photographed image of the real space. The method is characterized in that: in the system, at each of one or more predefined positions on a real object present in the predetermined space, an MR marker constituted of an identification code containing position information corresponding to that position and an alignment marker having a polygonal shape is disposed, and virtual space data including three-dimensional space data of the real object present in the predetermined real space, the three-dimensional data being obtained in advance and constituted of three-dimensional shape elements each having three-dimensional position information in a virtual space, and also including virtual object data disposed in the virtual space, as well as a Web application identified on the basis of an identifier included in the identification code, are stored, the Web application provides a mixed-reality-image displaying webpage, and the mixed-reality-image displaying webpage causes the photographing device to be activated when loaded by the portable terminal device and includes a display area of a mixed-reality image based on the photographed image of the real space photographed by the photographing device. The method includes the following steps performed by the portable terminal device: a step of recognizing the identification code in the case where the photographing device is activated and the MR marker is photographed by the photographing device, thereby activating a browser and accessing the identifier included in the recognized identification code to display the mixed-reality-image displaying webpage; a step of recognizing the alignment marker constituting the MR marker in the case where the Web application is activated, the MR marker is photographed by the photographing device, and the identification code is recognized; a step of determining a viewpoint position of a virtual camera in the virtual space corresponding to the position and photographing direction of the photographing device in the real space on the basis of a positional relationship between the portable terminal device and the recognized alignment marker, the positional relationship being, determined from the shape and size of the alignment marker, as well as position information contained in the identifier included in the identification code; and a step of generating a mixed-reality image in which the virtual object is superimposed on the photographed image of the real space, which is to be displayed in the display area of the mixed-reality-image displaying webpage, on the basis of the virtual space data and the viewpoint position of the virtual camera.

Furthermore, in order to achieve the above object, a portable terminal device according to an aspect of the present invention is a portable terminal device in a mixed-reality system including a server and the portable terminal device, the portable terminal device having a display for displaying a virtual object to a user present in a predetermined real space and also having a photographing device that photographs the real space, the mixed-reality system serving to display, on the display, a mixed-reality image in which the virtual object is superimposed on a photographed image of the real space, characterized in that: wherein, in the system, at each of one or more predefined positions on a real object present in the predetermined space, an MR marker constituted of an identification code containing position information corresponding to that position and an alignment marker having a polygonal shape is disposed, and virtual space data including three-dimensional space data of the real object present in the predetermined real space, the three-dimensional data being obtained in advance and constituted of three-dimensional shape elements each having three-dimensional position information in a virtual space, and also including virtual object data disposed in the virtual space, as well as a Web application identified on the basis of an identifier included in the identification code, are stored, the Web application provides a mixed-reality-image displaying webpage, and the mixed-reality-image displaying webpage causes the photographing device to be activated when loaded by the portable terminal device and includes a display area of a mixed-reality image based on the photographed image of the real space photographed by the photographing device. The portable terminal device includes: a browser unit that accesses the identifier included in the identification code to display the mixed-reality-image displaying webpage provided by the Web application; a marker recognition unit that recognizes the alignment marker constituting the MR marker in the case where the Web application is activated, the MR marker is photographed by the photographing device, and the identification code is recognized; a position determination unit that determines a viewpoint position of a virtual camera in the virtual space corresponding to the position and photographing direction of the photographing device in the real space on the basis of the position information contained in the identifier accessed by the browser unit as well as a positional relationship between the portable terminal device and the alignment marker recognized by the marker recognition unit, the positional relationship being determined from the shape and size of the alignment marker; and an image generation unit that generates a mixed-reality image in which the virtual object is superimposed on the photographed image of the real space, which is to be displayed in the display area of the mixed-reality-image displaying webpage, on the basis of the virtual space data and the viewpoint position of the virtual camera.

Advantageous Effects of Invention

The present invention makes it possible for a user to more readily experience MR in accordance with the place where the user is.

DESCRIPTION OF EMBODIMENTS

A mixed-reality system according to an embodiment of the present invention will be described with reference to the drawings.

The mixed-reality system according to this embodiment allows a user to experience MR, for example, by rendering a virtual object, which exists in a virtual space, in a superimposed manner on a photographed image of a real space viewed by the user through the screen of a smartphone. The virtual object is computer graphics occupying only a small portion of the screen, such as a game character. In this description, for convenience of explanation, in some cases, explanations that are more detailed than necessary are omitted. For example, there are cases where detailed explanations of already known features or repeated explanations of substantially the same configurations are omitted.

Figure 1:
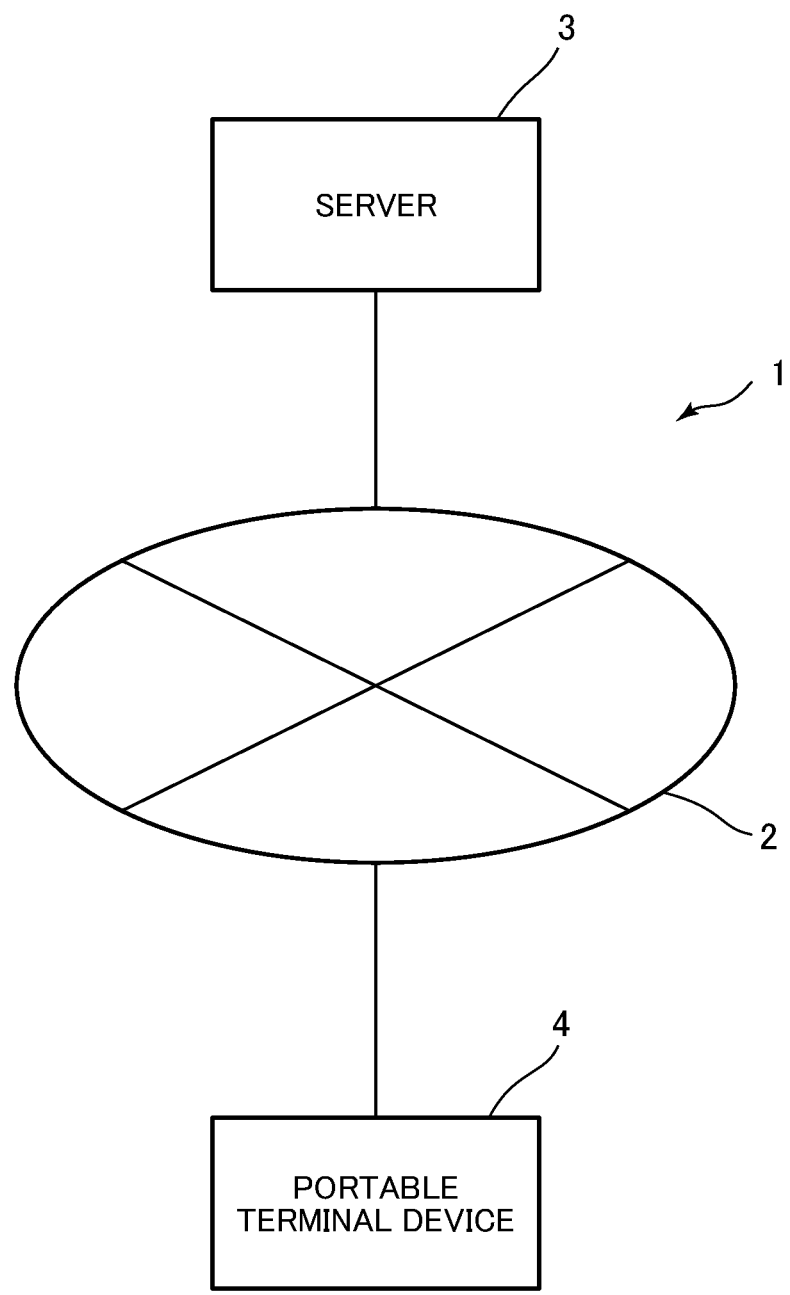
FIG. 1 is an overall configuration diagram of a mixed-reality system according to an embodiment of the present invention.

FIG. 1 is an overall configuration diagram of a mixed-reality system 1 according to an embodiment of the present invention. As shown in FIG. 1, the mixed-reality system 1 includes a server 3 and a portable terminal device 4, and the server 3 and the portable terminal device 4 are connected to a network 2, such as the Internet, so as to be able to communicate with each other.

Figure 2:
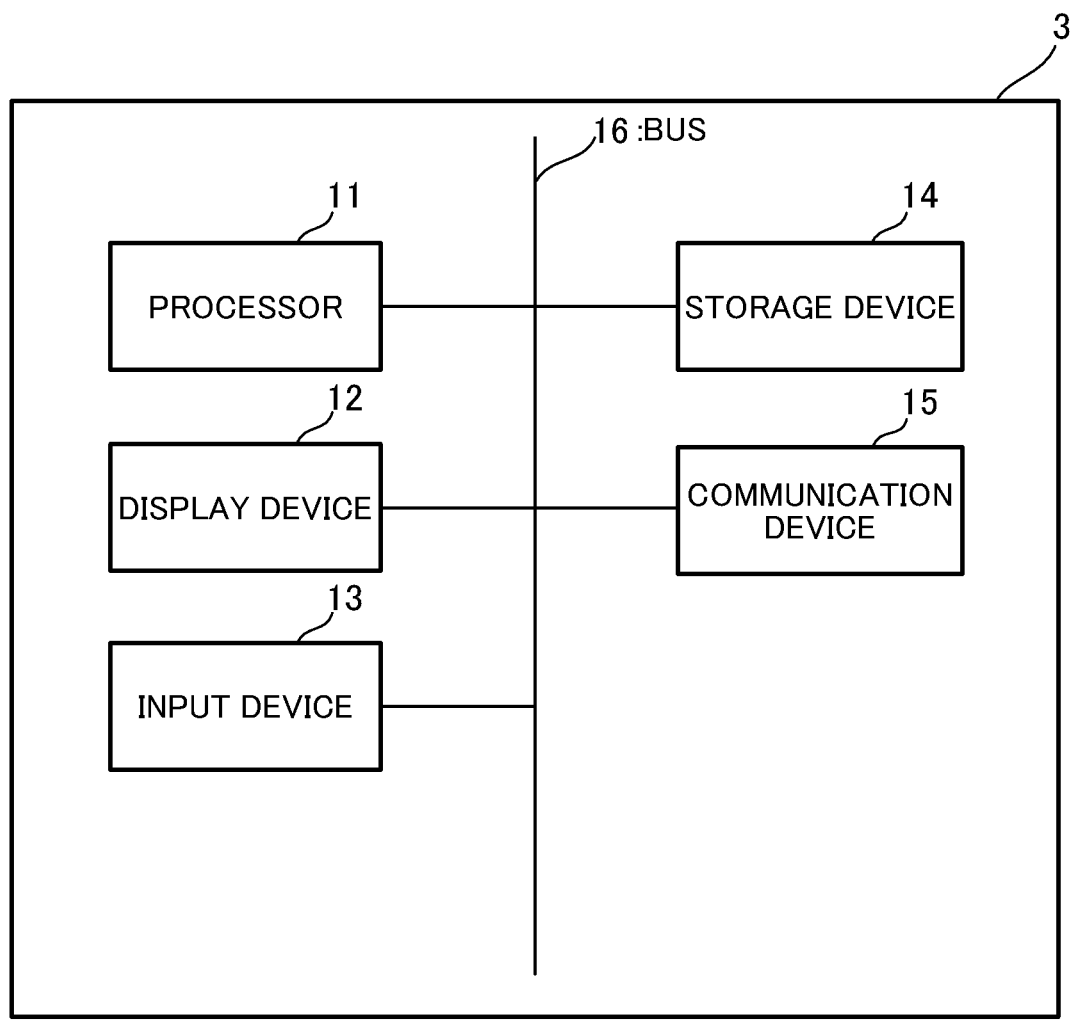
FIG. 2 is a block diagram showing the hardware configuration of a server according to the embodiment of the present invention.

FIG. 2 is a block diagram showing the hardware configuration of the server 3 according to the embodiment of the present invention. The server 3 includes a processor 11, a display device 12, an input device 13, a storage device 14, and a communication device 15. These individual constituent devices are connected via a bus 16. It is assumed that interfaces are interposed as necessary between the bus 16 and the individual constituent devices.

The processor 11 controls the overall operation of the server 3, and for example, the processor 11 is a CPU.

Alternatively, an electronic circuit such as an MPU may be used as the processor 11. The processor 11 executes various kinds of processing by loading programs and data stored in the storage device 14 and executing the programs. In one example, the processor 11 is constituted of a plurality of processors.

The display device (display) 12 displays an application screen, etc. to a user of the server 3 under the control of the processor 11. The input device 13 accepts input to the server 3 from a user, and for example, the input device 13 is a touchscreen, a touchpad, a keyboard, or a mouse.

The storage device 14 includes a main storage device and an auxiliary storage device. The main storage device is a semiconductor memory, such as a RAM. A RAM is a volatile storage medium that allows high-speed information reading and writing, and is used as a storage area and a work area when the processor 11 processes information. The main storage device may include a ROM, which is a read-only non-volatile storage medium. In this case, the ROM stores a program such as firmware. The auxiliary storage device stores various kinds of programs and data that is used by the processor 11 when executing the individual programs. The auxiliary storage device is, for example, a hard disk device; however, any type of non-volatile storage or non-volatile memory that is capable of storing information, which may be of the removable type, may be used. The auxiliary storage device stores, for example, an operating system (OS), middleware, application programs, various kinds of data that may be referred to as these programs are being executed, etc.

In one preferred example, the storage device 14 stores data (e.g., tables) and programs for various kinds of databases. The various kinds of databases are realized by the operation of the processor 11, etc. The server 3 may have the functionality of a database server and may include one or more database servers, or may include other kinds of servers.

The communication device 15 sends and receives data to and from other computers, such as the portable terminal device 4, via the network 2. For example, the communication device 15 connects to the network 2 by carrying out wired communication via an Ethernet (registered trademark) cable or the like or wireless communication such as mobile communication or wireless LAN communication.

Figure 3:
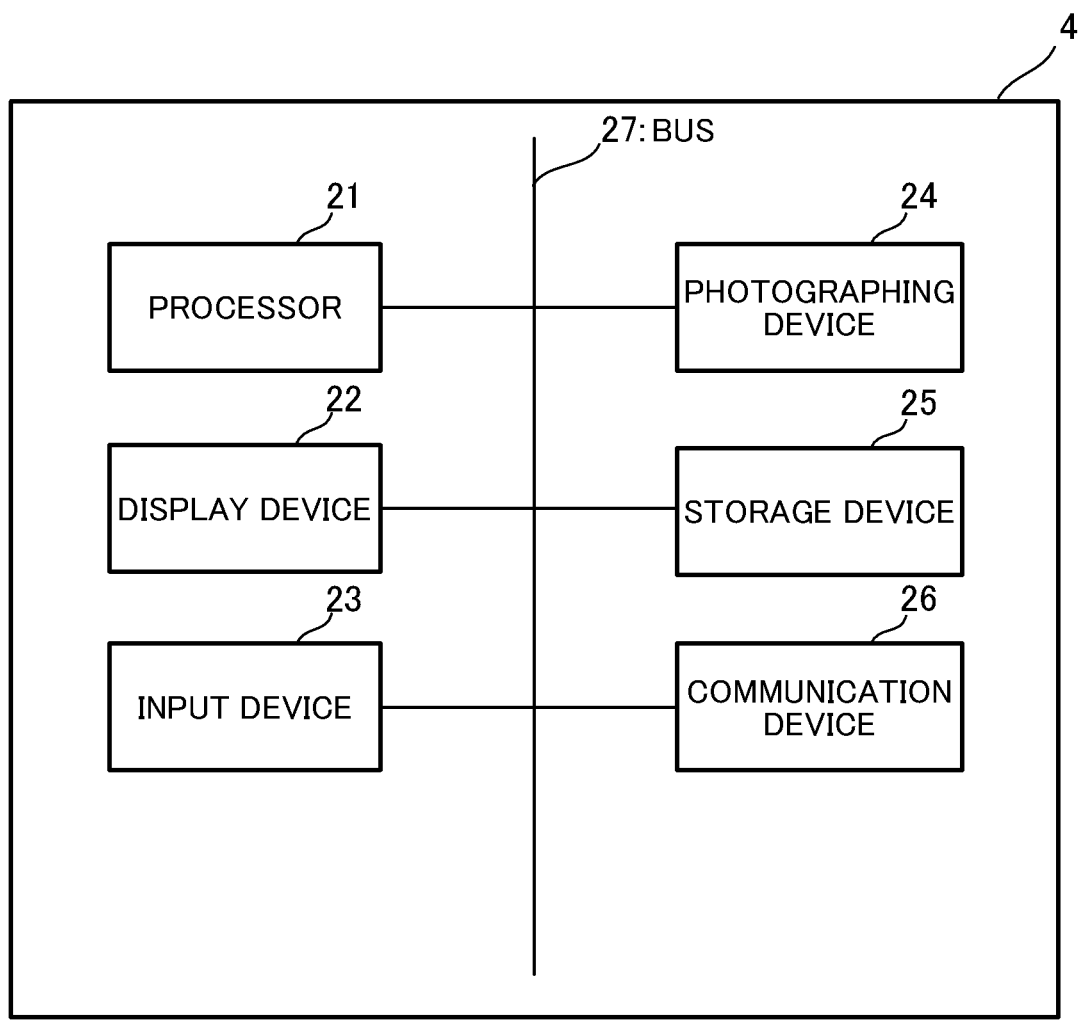
FIG. 3 is a block diagram showing the hardware configuration of a portable terminal device according to the embodiment of the present invention.

FIG. 3 is a block diagram showing the hardware configuration of the portable terminal device 4 according to the embodiment of the present invention. In this embodiment, the portable terminal device 4 is a smartphone. The portable terminal device 4 includes a processor 21, a display device 22, an input device 23, a photographing device 24, a storage device 25, and a communication device 26. These individual constituent devices are connected via a bus 27. It is assumed that interfaces are interposed as necessary between the bus 27 and the individual constituent devices. Alternatively, the portable terminal device 4 may be a computer equipped with a touch-based input device or the like, such as a tablet computer or a touchpad, as long as it has the configuration described above.

The processor 21 controls the overall operation of the portable terminal device 4, and, for example, the processor 21 is a CPU. Alternatively, an electronic circuit such as an MPU may be used as the processor 21. The processor 21 executes various kinds of processing by loading programs and data stored in the storage device 25 and executing the programs. In one example, the processor 21 is constituted of a plurality of processors.

The display device (display) 22 displays an application screen, an image photographed by the photographing device 24, etc. to the user of the portable terminal device 4 under the control of the processor 21. The display device 22 is preferably a liquid crystal display; alternatively, however, the display device 22 an organic EL display, a plasma display, or the like.

The input device 23 has the functionality for accepting input from the user, like a touchscreen, a touchpad, input buttons, or the like. In this embodiment, since the portable terminal device 4 is a smartphone, the portable terminal device 4 includes a touchscreen as the input device 23, and the touchscreen also functions as the display device; that is, the display device 22 and the input device 23 have an integrated structure. Alternatively, however, the display device 22 and the input device 23 may be disposed at separate positions in separate forms.

The photographing device (imaging device) 24 photographs (captures) a still image or a movie of a real space and stores the photographed image or movie data in the storage device 25. The photographing device 24 is, for example, a camera constituted of an image sensor or the like.

The storage device 25 is a storage device included in an ordinary smartphone, including a RAM, which is a volatile memory, and a ROM, which is a non-volatile memory. The storage device 25 may also include an external memory.

In one example, the storage device 25 includes a main storage device and an auxiliary storage device. The main storage device is a volatile storage medium that allows high-speed information reading and writing, and is used as a storage area and a work area when the processor 21 processes information. The auxiliary storage device stores various kinds of programs and data that is used by the processor 21 when executing the individual programs. The auxiliary storage device is, for example, a hard disk device; however, any type of non-volatile storage or non-volatile memory that is capable of storing information, which may be of the removable type, may be used. The auxiliary storage device stores, for example, an operating system (OS), middleware, application programs, various kinds of data that may be referred to as these programs are being executed, etc.

The communication device 26 sends and receives data to and from other computers, such as the server 3, via the network 2. For example, the communication device 26 connects to the network 2 by carrying out wireless communication such as mobile communication or wireless LAN communication. In one example, a program is downloaded from the server 3 by the communication device 26 and is stored in the storage device 25. Alternatively, however, the communication device 26 may carry out wired communication using an Ethernet (registered trademark) cable or the like.

Figure 4:
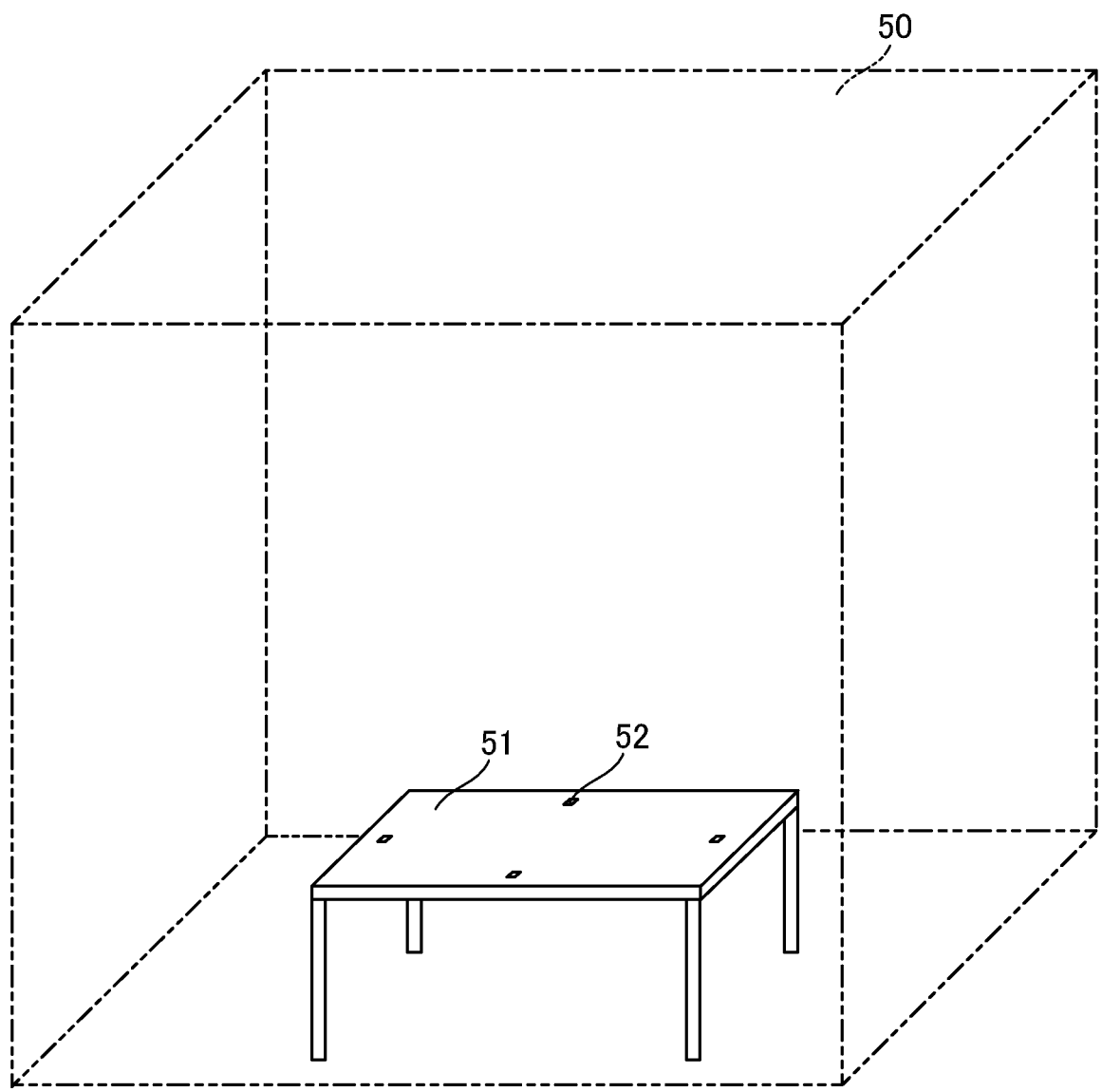
FIG. 4 shows an example of a predetermined real space in which the mixed-reality system provides a user with a sense of mixed reality.

As a real-world space (predetermined real space) in which the mixed-reality system 1 according to this embodiment provides the user with a sense of mixed reality (MR), a real space 50 shown in FIG. 4, which is an indoor space defined in advance, is assumed. A desk 51, which is an object in the real world, is disposed in the real space 50.

In this embodiment, in a virtual space 60 associated with the real space 50, the three-dimensional shape of a real object is represented by three-dimensional space data using basic units each having three-dimensional position information in the virtual space. The basic unit will be referred to as a three-dimensional shape element. In this embodiment, a three-dimensional mesh is used as the three-dimensional shape element. Thus, three-dimensional space data is constituted of three-dimensional meshes. A three-dimensional mesh is formed of one or more polygons, and at least one of the vertices of the polygons constituting each three-dimensional mesh has three-dimensional position information. Alternatively, the three-dimensional element may be point cloud data or the like.

The three-dimensional space data is obtained in advance as follows. In one example, first, point cloud data representing the three-dimensional shape of a real object in the real space 50 is obtained in advance by using, for example, a high-precision laser scanner (not shown). Each of the point cloud data has, for example, three-dimensional coordinates (x, y, z), which is located in the virtual space 60 associated with the real space 50. Each of the point cloud data is colored point cloud data having color information. Then, by using a known method, polygons having vertices at the individual point clouds are formed from the colored point cloud data obtained as described above. A three-dimensional mesh is formed from the polygons. In another example, a three-dimensional mesh is generated by using a known method from a plurality of photographed images in the real space 50. Note that since it is not necessary for the three-dimensional shape elements constituting the three-dimensional space data to have color information, the point cloud data need not include color information in the above example.

MR markers 52 are disposed at one or more predefined positions on the desk 51, which is a real object present in the real space 50. In one example, the MR markers 52 are disposed at a plurality of positions on the surface of the desk 51, as shown in FIG. 4.

Figure 5:
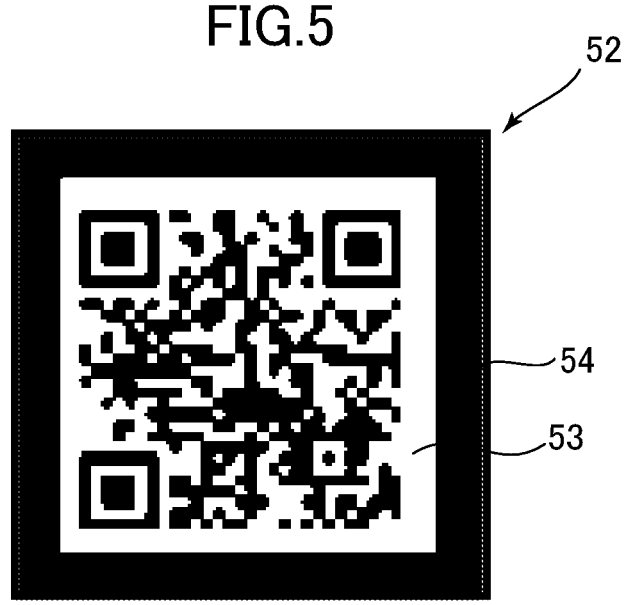
FIG. 5 shows an example of an MR marker.

FIG. 5 shows an example of an MR marker 52. Each of the MR markers 52 is constituted of an identification code 53 including an identifier 55 containing position information corresponding to the position where that MR marker 52 is disposed and an alignment marker 54 having a rectangular shape.

Figure 6:
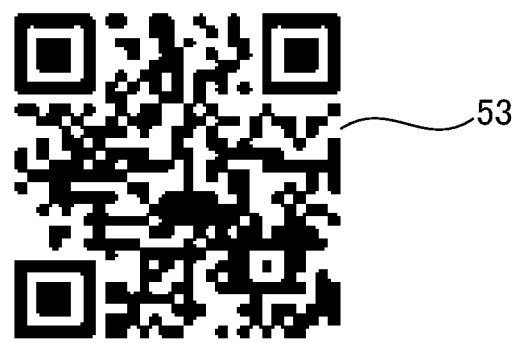
FIG. 6 shows an example of an identification code.

FIG. 6 shows an example of the identification code 53. It is assumed that, in this embodiment, the identification code 53 is a QR code (registered trademark) (hereinafter referred to as a "two-dimensional code") and the identifier 55 is a URL. The identification code 53 is a marker for activating a browser when it is photographed by the portable terminal device 4, and the identification code 53 is a marker for identifying a photographed MR marker 52. The identifier 55 includes the information regarding activation and initialization of a Web application stored in the server 3, as well as position information corresponding to the position of the relevant MR marker 52. In one example, the two-dimensional code 53 is recognized by a two-dimensional code reader app (QR code (registered trademark) reader app), and the URL 55 contained in the two-dimensional code 53 is extracted by the two-dimensional code reader app. In one modification, the identification code 53 may be other kinds of two-dimensional code, such as a data matrix.

In one example, the URL 55 is URL (1) given below: https://server name/ID of MR scene/@latitude, longitude, angle The server name and the ID of the MR scene specify the position for accessing the server 3, and are each constituted of alphanumerical character sequence data. The latitude, longitude, and angle indicate the latitude of the MR marker 52, the longitude of the MR marker 52, and the angle (orientation) of the MR marker 52, and are each constituted of numerical data. URL(1) may include numerical data indicating the elevation of the MR marker 52. Alternatively, the identifier 55 may be an identifier other than a URL, specifying a file location.

Figure 7:
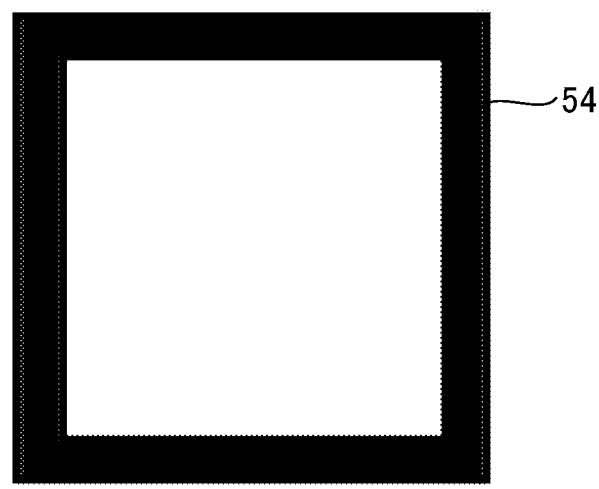
FIG. 7 shows an example of an alignment marker.

FIG. 7 shows an example of the alignment marker 54. In this embodiment, the alignment marker 54 has a square shape, and is disposed along the edges of an identification code. The alignment marker 54 is a marker for calculating the position and orientation of the portable terminal device 4 when the alignment marker 54 is photographed by the portable terminal device 4, and the size and shape thereof are defined in advance. Since the alignment marker 54 is a marker for calculating the position and orientation of the portable terminal device 4, the alignment marker 54 may have a polygonal shape other than a square shape. Since the alignment marker 54 is not a marker for identifying an MR marker 52, preferably, the alignment marker 54 has a square shape common among all the MR markers 52 that are provided. This serves to reduce the amount of computation by the system.

Note that although the predetermined real space in which the mixed-reality system 1 according to this embodiment provides the user with MR is considered to be the real space 50 shown in FIG. 4 for convenience of explanation, what is shown in FIG. 4 is an example, and there is no limitation thereto. For example, the real space 50 may be an indoor space enclosed by walls or an outdoor space. Furthermore, for example, the real space 50 may be a single defined space or may include a plurality of defined spaces. Furthermore, for example, the real object need not be the desk 51 but may be a chair, a shelf, a wall, the ground, etc., and the real space 50 may include a plurality of real objects. Furthermore, for example, the positions of the MR markers 52 need not be a plurality of positions on the surface of the desk 51 as long as the positions are one or more predefined positions on a real object present in the real space 50.

Figure 8:
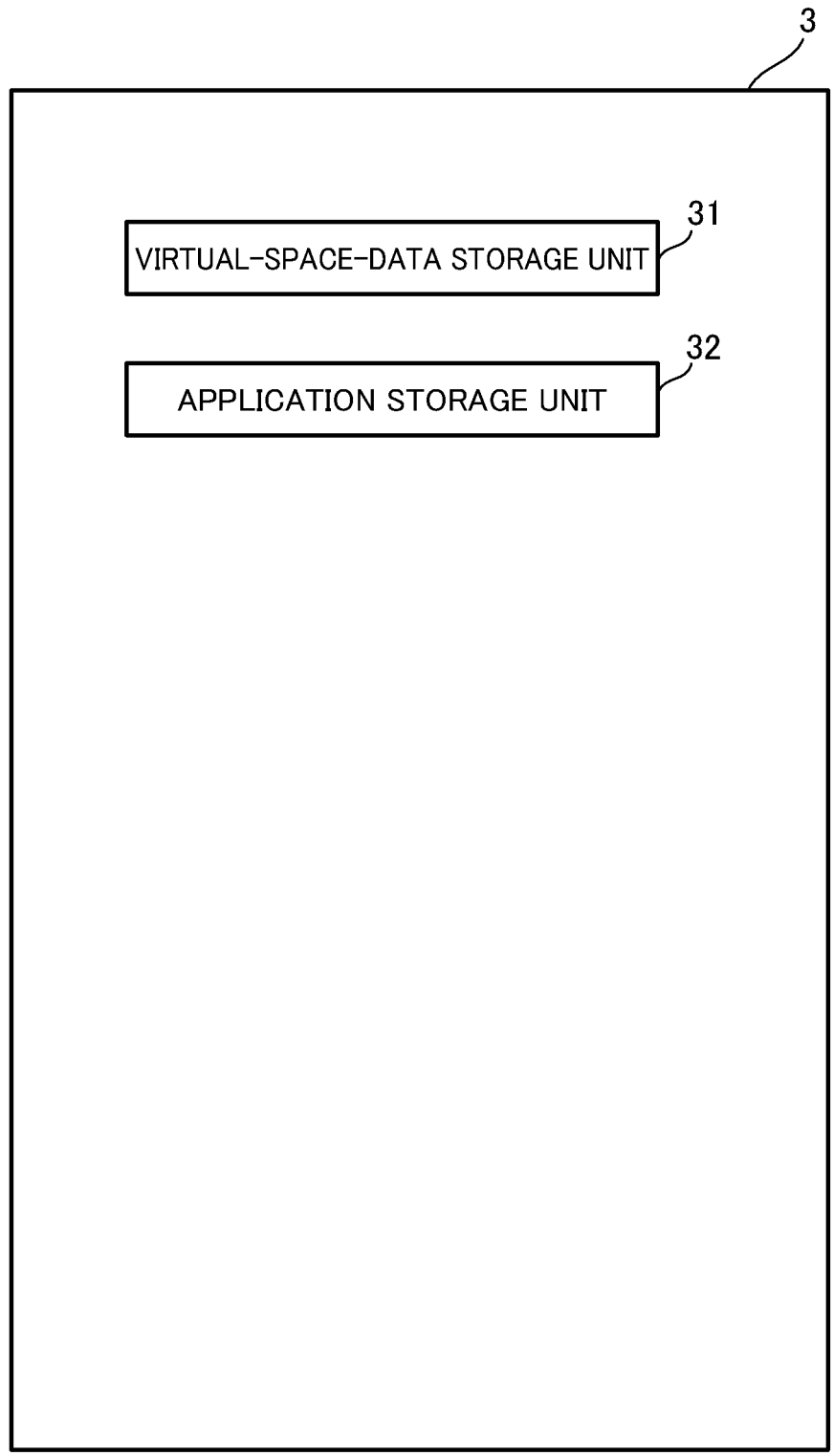
FIG. 8 is a functional block diagram of the server 3 according to the embodiment of the present invention.

FIG. 8 is a functional block diagram of the server 3 according to the embodiment of the present invention. The server 3 includes a virtual-space-data storage unit 31 and an application storage unit 32. In this embodiment, these functions are realized by the processor 11 executing programs. In this embodiment, since various functions are realized by loading programs, a portion of one part (function) may be provided in another part. Alternatively, these functions may be realized in hardware by configuring an electronic circuit or the like for realizing the functions in part or in entirety. The server 3 may be constituted of a single server device or a plurality of server devices.

The virtual-space-data storage unit 31 stores virtual space data including three-dimensional data of the real object present in the real space 50, obtained in advance, and also including virtual object data, which is data of the three-dimensional virtual object disposed in the virtual space 60. In the case where the three-dimensional shape element is a three-dimensional mesh, the virtual object data is also formed of three-dimensional meshes. For each of the MR markers 52 that are provided, the virtual-space-data storage unit 31 stores virtual space data in a virtual space 60 corresponding to a real space 50 around that MR marker 52. Specifically, the virtual-space-data storage unit 31 stores virtual space data for the individual MR markers 52 that are provided by storing virtual space data in association with the identifiers 55 included in the identification codes 53.

In one example, the virtual-space-data storage unit 31 functions as a database that stores virtual space data, and the storage device 14 stores data and a program for the database. In one example, as the virtual-space-data storage unit 31, the server 3 includes a database server that stores virtual space data. In one example, the virtual object data is data of a virtual object whose shape changes in time.

The application storage unit 32 stores Web applications 33 (hereinafter referred to as "Web apps 33") identified on the basis of the identifiers 55 included in the identification codes 53. A Web app 33 provides the portable terminal device 4 accessing that Web app 33 with a webpage for displaying a mixed-reality image (hereinafter referred to as an "MR experiencing page 34"). The MR experiencing page 34, when loaded by the portable terminal device 4, causes the photographing device 24 to be activated, and includes a display area for displaying a mixed-reality image based on a photographed image (or photographed movie) of the real space 50 photographed by the photographing device 24. In the case where there is no virtual object to be rendered in a superimposed manner, the MR experiencing page 34 displays a photographed image (or photographed movie) of the real space 50 photographed by the photographing device 24 in the mixed-reality-image display area. Note that the MR experiencing page 34 should preferably be configured such that the mixed-reality-image display area occupies a large portion of the display 22, similarly to an ordinary camera app.

In one example, the portable terminal device 4 interprets a URL 55 extracted from a two-dimensional code via a two-dimensional code reader app as a URL of a Web browser, and a browser of the portable terminal device 4 directly accesses the URL 55. The server 3 sends HTML, JavaScript (registered trademark), images, etc. needed for the execution of the Web app 33 to the portable terminal device 4 as a response. What is displayed as the response at the portable terminal device 4 on the basis of the data transmitted to the portable terminal device 4 corresponds to the MR experiencing page 34 in this embodiment. JavaScript (registered trademark) is embedded in the MR experiencing page 34, and JavaScript (registered trademark) is executed when the MR experiencing page has been loaded into the portable terminal device 4. Then, the photographing device 24 is activated, for example, by the HTML Media Capture API. In one example, as the application storage unit 32, the server 3 includes an application server that stores Web apps 33. In one example, in the case where the URL 55 is URL(1) mentioned earlier and the URL 55 is loaded from JavaScript (registered trademark) at the portable terminal device 4 via the MR experiencing page 34, the portable terminal device 4 accesses the URL 55 including the part after "@". In this case, the server 3 determines that the access from the portable terminal device 4 is an access from the Web app 33, and sends the virtual space data or virtual object data corresponding to the URL 55 to the portable terminal device 4 as a response.

Figure 9:
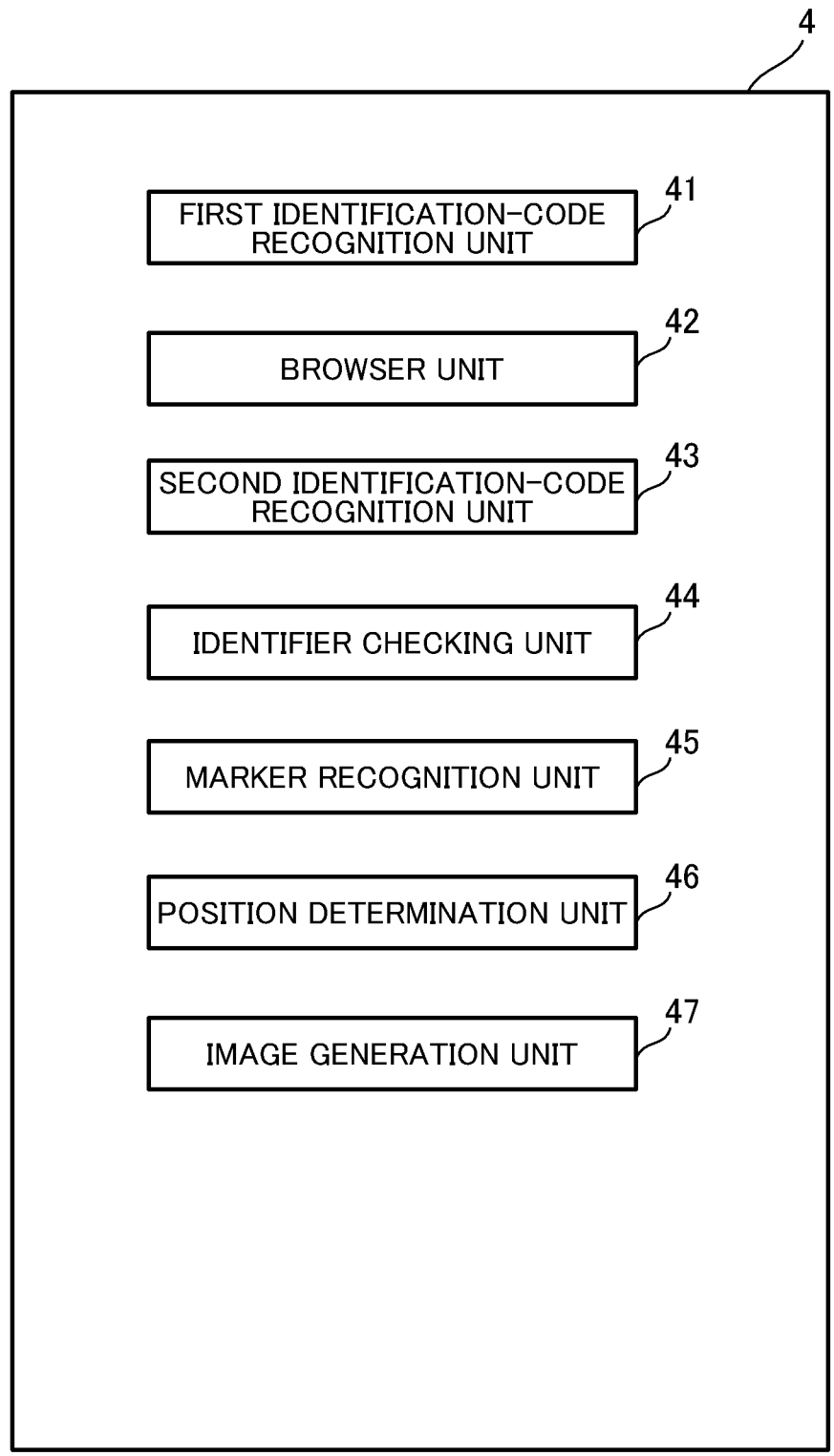
FIG. 9 is a functional block diagram of the portable terminal device according to the embodiment of the present invention.

FIG. 9 is a functional block diagram of the portable terminal device 4 according to the embodiment of the present invention. The portable terminal device 4 includes a first identification-code recognition unit 41, a browser unit 42, a second identification-code recognition unit 43, an identifier checking unit 44, a marker recognition unit 45, a position determination unit 46, and an image generation unit 47. In this embodiment, these functions are realized by the processor 21 executing programs. In this embodiment, since various functions are realized by loading programs, a portion of one part (function) may be provided in another part. Alternatively, these functions may be realized in hardware by configuring an electronic circuit or the like for realizing the functions in part or in entirety.

The first identification-code recognition unit 41 recognizes the identification code 53 when an MR marker 52 is photographed by the photographing device 24. The browser unit 42 accesses the identifier 55 included in the identification code 53 recognized by the first identification-code recognition unit 41 to display an MR experiencing page 34 provided by a Web app 33 identified on the basis of the identifier 55.

In one example, the portable terminal device 4 has installed thereon a two-dimensional code reader app and a browser like those installed on an ordinary smartphone. In this case, the two-dimensional code reader app has the function of the first identification-code recognition unit 41, and the browser has the function of the browser unit 42. In this case, the two-dimensional code reader app activates the photographing device 24 when executed and, when an MR marker 52 is photographed by the activated photographing device 24, recognizes (identifies) a two-dimensional code 53 from the photographed image and extracts a URL 55 from the two-dimensional code 53. Upon extracting the URL 55, the two-dimensional code reader app activates the browser. After accessing the URL 55 extracted by the two-dimensional code reader app, the browser accesses a Web app 33 on the server 3, identified on the basis of the URL 55, and displays an MR experiencing page 34 on the basis of a response received from the server 3. The Web app 33 is activated when accessed in this manner.

In one example, in the case where the URL 55 is URL(1) mentioned earlier, a Web app 33 on the server 3 is identified on the basis of the part before "@", and the portable terminal device 4 accesses the Web app 33 by accessing the URL 55.

In the case where the photographing device 24 photographs an MR marker 52 after the portable terminal device 4 accesses the MR experiencing webpage 34, the second identification-code recognition unit 43 newly recognizes an identification code 53 from the photographed image. Alternatively, in the case where the browser has accessed the MR experiencing webpage 34 or is displaying the webpage 34 and the photographing device 24 photographs an MR marker 52, the second identification-code recognition unit 43 newly recognizes an identification code 53 from the photographed image. In one example, JavaScript (registered trademark) embedded in the MR experiencing page 34 is automatically executed to activate the photographing device 24, whereby the function of the second identification-code recognition unit 43 is realized. In one example, the browser has the function of the second identification-code recognition unit 43. In one example, a single application or API provided in the portable terminal device 4 has the functions of the first identification-code recognition unit 41 and the second identification-code recognition unit 43. As described above, the first identification-code recognition unit 41 and the second identification-code recognition unit 43 may be implemented as the same software module.

When the Web app 33 is activated and the identification code 53 is recognized by the second identification-code recognition unit 43, the identifier checking unit 44 checks whether or not the identifier 55 included in the recognized identification code 53 is the same as the identifier 55 accessed by the browser unit 42. In one example, the identifier checking unit 44 checks whether or not the URL 55 accessed by the browser is the same as the URL 55 extracted from the two-dimensional code recognized from the MR marker 52 displayed in the mixed-reality-image display area in the MR experiencing page 34.

The marker recognition unit 45 recognizes the alignment marker 54 in the case where an identification code 53 has been newly recognized by the second identification-code recognition unit 43. In one preferred example, the marker recognition unit 45 recognizes the alignment marker 54 when the identifier checking unit 44 has determined that the identifiers are the same. With this configuration, since the marker recognition unit 45 recognizes the alignment marker 54 in the case where the newly recognized identification code 53 is the one included in the MR marker 52 that has activated the Web app 33, it becomes possible to distinguish the MR marker 52 that has activated the Web app 33 from the other MR markers 52.

In one example, the identification code 53 and the alignment marker 54 are configured in an integrated form in the MR marker 52, the marker recognition unit 45 cannot recognize the alignment marker 54 from the image of the MR marker 52 as is. Thus, the marker recognition unit 45 extracts and recognizes the alignment marker 54 by erasing the recognized identification code 53 by way of image processing. For example, the marker recognition unit 45 recognizes the alignment marker 54 by painting and erasing the identification code 53 with a predefined color, such as the background color of the desk 51 on which the MR marker 52 is disposed.

The position determination unit 46 determines the position of the portable terminal device 4 and the angle of photography of the photographing device 24 in the real space 50 on the basis of the positional relationship between the portable terminal device 4 and the alignment marker 54, which is determined from the position information contained in the identifier 55 accessed by the browser unit 42 as well as the shape and size of the alignment marker 54. That is, the position determination unit 46 determines the viewpoint position of the virtual camera in the virtual space 60, corresponding to the position of the portable terminal device 4 (the position of the photographing device 24) and the photographing direction of the photographing device 24. The identification code 53 that is referred to by the position determination unit 46 is the identification code 53 recognized by the second identification-code recognition unit 43, which is the identification code 53 containing the identifier 55 accessed by the browser unit 42.

In one example, the position determination unit 46 determines the viewpoint position of the virtual camera in the following manner. In the case where the identifier 55 includes information indicating the latitude, longitude, elevation, and angle (orientation) of the MR marker 52, the position determination unit 46 determines a rough position of the portable terminal device 4 as an absolute position from the information included in the identifier 55. For example, the position that is determined here is 6DoF serving as an absolute position. Furthermore, the position determination unit 46 recognizes the alignment marker 54 recognized by the marker recognition unit 45 as an image, and calculates a coordinate transformation matrix T, given in Eq. (1), for conversion from the marker coordinate system to the camera coordinate system.

$$T = \begin{bmatrix} r_1 & r_2 & r_3 & t_x \\ r_4 & r_5 & r_6 & t_y \\ r_7 & r_8 & r_9 & t_z \end{bmatrix} \quad \text{(Eq. 1)}$$

In Eq. (1), r signifies rotational components, and t signifies translational components. The position determination unit 46 determines the position and orientation of the MR marker 52 in the image photographed by the photographing device 24 in the camera coordinate system by using the coordinate transformation matrix, thereby determining the relative position of the MR marker 52 in relation to the photographing device 24. For example, the position that is determined here is 6DoF serving as a relative position. The position determination unit 46 determines the absolute position of the photographing device 24 in the virtual space 60 by using the absolute position and relative position determined as described above, thereby determining the viewpoint position of the virtual camera. The absolute position of the photographing device 24 may be 6DoF or a quaternion.

The image generation unit 47 generates a mixed-reality image in which a virtual object is superimposed on a photographed image of the real space 50 on the basis of the virtual space data stored in the virtual-space-data storage unit 31 and the viewpoint position of the virtual camera determined by the position determination unit 46. When the identifier 55 is accessed by the browser unit 42, the image generation unit 47 obtains the virtual space data corresponding to the identifier 55 from the virtual-space-data storage unit 31, and generates a mixed-reality image as viewed from the viewpoint position of the virtual camera by using the obtained virtual space data. In generating the mixed-reality image, it is possible to use a known method, such as the method disclosed in Patent Literature 1. The mixed-reality image generated by the image generation unit 47 is displayed in the display area of the MR experiencing page 34. In one preferred example, the image generation unit 47 generates an MR movie by generating mixed-reality images at a predetermined frame rate. In one example, the browser unit 42 displays the mixed-reality image generated by the image generation unit 47 in the display area of the MR experiencing page 34. Alternatively, since the data that is superimposed on the photographed image by the image generation unit 47 is virtual object data, the data that is obtained from the virtual-space-data storage unit 31 by the image generation unit 47 may be only virtual object data in the virtual space data.

The following further describes processing executed by the individual units in the case where it is determined by the identifier checking unit 44 that the identifiers are not the same. The second identification-code recognition unit 43 recognizes an identification code 53 that has not been subjected to the determination by the identifier checking unit 44 from the photographed image subjected to recognition, and the identifier checking unit 44 checks whether or not the identifier 55 included in the recognized identification code 53 is the same as the identifier 55 accessed by the browser unit 42. The second identification-code recognition unit 43 and the identifier checking unit 44 execute the above processing as long as the photographed image subjected to recognition includes any identification code 53 that has not been subjected to the determination by the identifier checking unit 44.

In the above case, in the case where an identification code 53 determined as being the same by the identifier checking unit 44 is not recognized by the second identification-code recognition unit 43, the accessing unit 42 accesses the identifier 55 included in one of the identification codes 53 newly recognized by the second identification-code recognition unit 43. For example, the identification code 53 is an identification code 53 that is located centermost in the photographed image subjected to recognition by the second identification-code recognition unit 43. At this time, the browser unit 42 continues displaying the MR experiencing page 34 without reloading the displayed MR experiencing page 34. The marker recognition unit 45 recognizes the alignment marker 54 included in the MR marker 52 constituting the identification code 53 including the identifier 55 accessed by the browser unit 42. The image generation unit 47 obtains the virtual space data corresponding to the identifier 55 accessed by the browser unit 42 from the virtual-space-data storage unit 31, and generates a mixed-reality image as viewed from the viewpoint position of the virtual camera by using the obtained virtual space data.

In one example, the function of the browser unit 42 described above is realized by using the history.pushState( ) function, which is a standard API for browsers. This makes it possible for the browser to dynamically rewrite the URL 55 without having to reload the MR experiencing page 34, while maintaining history information. In one example, the function of the image generation unit 47 for obtaining the virtual space data corresponding to the URL 55, described above, is realized by using the fetch( ) function in JavaScript (registered trademark). It becomes possible for the portable terminal device 4 to obtain data corresponding to the rewritten URL 55 from the server 3 by executing the JavaScript (registered trademark). At this time, in the case where the URL 55 is URL(1) mentioned earlier, the portable terminal device 4 accesses the URL 55 including the part after "a". The server 3 determines the access as being an access from a Web app 33, and sends the virtual space data corresponding to the URL 55 including the part after "@". In this case, JavaScript (registered trademark) is embedded in the MR experiencing page 34, and the portable terminal device 4 is configured to obtain data corresponding to the rewritten URL 55 from the server 3 when the URL 55 is dynamically rewritten as described above.

The mixed-reality system 1 according to this embodiment is further configured so as to be able to distribute a mixed-reality image or an MR movie displayed in the display area of the MR experiencing page 34 displayed by the portable terminal device 4 to other terminal devices that can be connected to the network 2, such as smartphones.

In one example, the server 3 accepts accesses from the portable terminal device 4 via a URL 55, and for example, the server 3 stores the mixed-reality image or the MR movie at a predetermined storage location of the storage device 25 in association with a URL. Other terminal devices can view the mixed-reality image or the MR movie by accessing the URL.

In one example, the server 3 stores a distribution webpage for providing WEBRTC, and the distribution webpage accepts accesses from the portable terminal device 4 via a URL 55. In this case, the browser installed in the portable terminal device 4 is of the type that supports WEBRTC. The distribution webpage receives a photographed image of the real space 50 photographed by the photographing device 24 and image data of a virtual object to be superimposed on the photographed image, constituting a mixed-reality image that is generated by the image generation unit 47. When the distribution page is accessed by another terminal device, the server 3 mutually notifies the portable terminal device 4 and the other terminal device of the IP addresses and port numbers thereof, making setting so as to enable peer-to-peer communication between these two terminal devices. This makes it possible for the other terminal device to view the mixed-reality image that is viewed by the user of the portable terminal device 4. In this case, two or more terminal devices can perform peer-to-peer communication. In another example, a server other than the server 3 stores the distribution webpage. In another example, when the distribution webpage is accessed by another terminal device, the other terminal device receives a photographed image of the real space 50 photographed by the photographing device 24 and image data of a virtual object to be superimposed on the photographed image from the server 3 or a server other than the server 3 (e.g., an MCU server or an SFU server).

Figure 10:
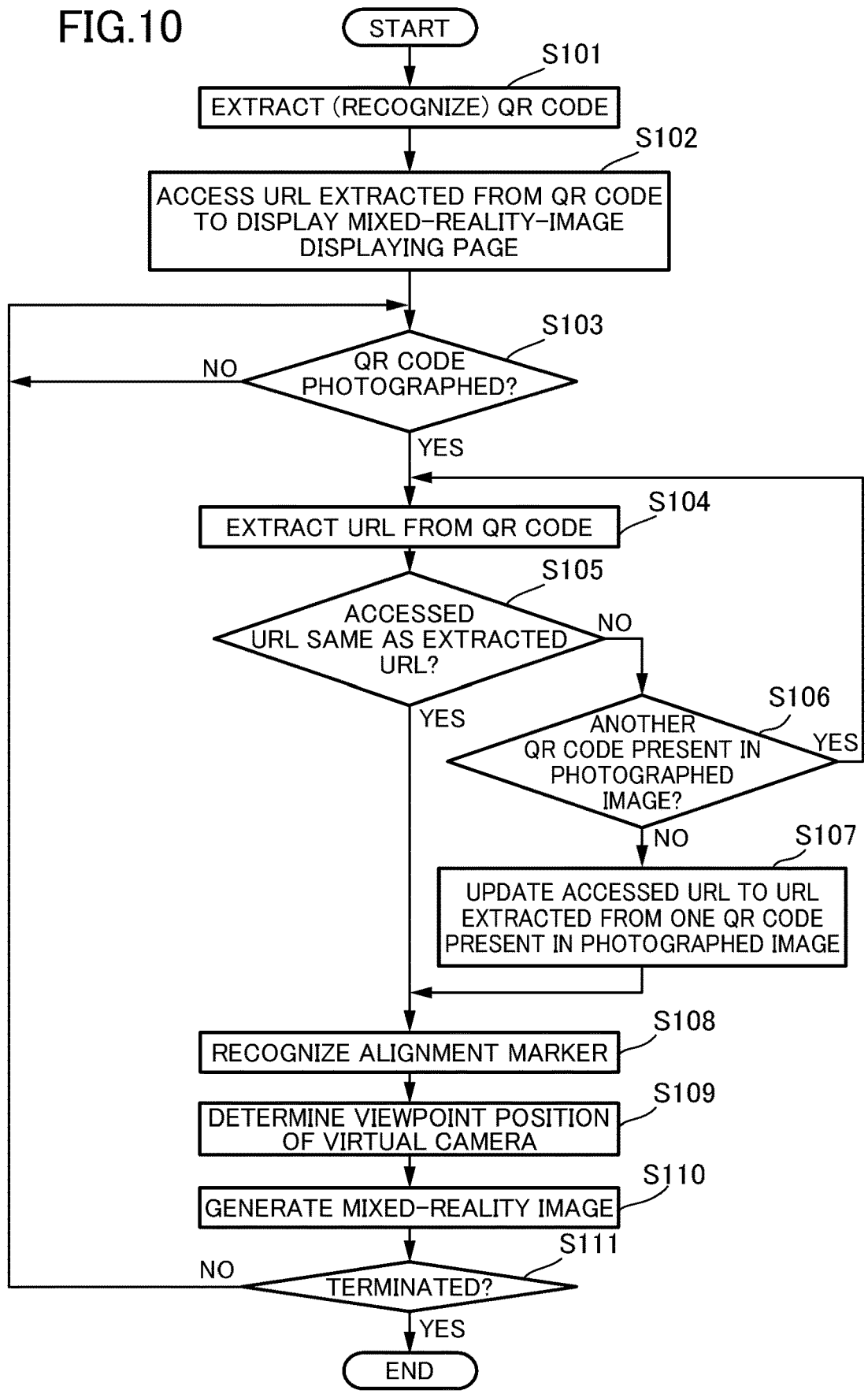
FIG. 10 is a flowchart showing information processing by the mixed-reality system according to the embodiment of the present invention.

Next, information processing by the mixed-reality system 1 according to the embodiment of the present invention will be described by using a flowchart shown in FIG. 10. The information processing shown in FIG. 10 is realized by causing the portable terminal device 4 to execute a program and also causing the server 3 to execute a program. In this processing, the user having the portable terminal device 4 is present in the real space 50, and the portable terminal device 4 has installed thereon a two-dimensional code reader app and a browser such as those installed on an ordinary smartphone.

In step 101, the portable terminal device 4 on which the two-dimensional code reader app has been activated photographs an MR marker 52 and then recognizes (extracts) a two-dimensional code from a photographed image of the photographing device 24. After extracting a URL 55 from the two-dimensional code 53 and loading the URL 55, the portable terminal device 4 (two-dimensional code reader app) activates the browser and passes the URL 55 as a parameter.

In step 102, the portable terminal device 4 (browser) accesses the URL 55 to display an MR experiencing page 34. When the browser accesses the URL 55, JavaScript (registered trademark) is automatically executed within the browser, whereby the photographing device 24 is activated. Note that since the processing until the activation of the photographing device 24 in steps 101 and 102 is a series of operations, during the normal first operation by the user, the photographing device 24 keeps photographing the MR marker 52 photographed in step 101. In this case, the MR marker 52 is displayed in the display area of the MR experiencing page 34.

The portable terminal device (browser) recognizes the two-dimensional code 53 from the photographed image of the photographing device 24 (step 103), and then in step 104, decodes a two-dimensional code 53 present in the photographed image to extract a URL 55. The portable terminal device 4 (browser) is configured to keep executing this processing until a two-dimensional code 53 is recognized in step 103; alternatively, however, the portable terminal device 4 may be configured to display an error message on the display. In step 104, a URL 55 may be extracted by decoding a two-dimensional code 53 by a function of the browser, or a URL 55 may be extracted by decoding a two-dimensional code 53 by JavaScript (registered trademark) that is executed within the browser.

In step 105, the portable terminal device 4 checks whether or not the URL 55 accessed by the browser and the URL 55 extracted in step 104 are the same. The processing proceeds to step 108 in the case where it is determined in step 105 that the URLs 55 are the same, and the processing proceeds to step 106 in the case where it is determined that the URLs 55 are not the same.

In step 106, the portable terminal device 4 (browser) checks whether or not there is any two-dimensional code 53 other than two-dimensional codes 53 already recognized from the photographed image of the photographing device 24. In the case where it is determined in step 106 that such a two-dimensional code 53 is present, in step 104, the portable terminal device 4 (browser) further extracts a URL 55 from a two-dimensional code 53 that is present in the photographed image and that has not yet been recognized.

Steps 104 to 106 are repeated, and the processing proceeds to step 107 in the case where none of the URLs 55 included in the two-dimensional codes recognized from the photographed image is the same as the URL 55 accessed by the browser. In the case where it is determined in step 105 that none is the same, the processing also proceeds from step 106 to step 107 in the case where the photographed image includes only one two-dimensional code 53.

In step 107, the portable terminal device 4 (browser) updates, for example, a URL 55 extracted from the two-dimensional code 53 located centermost in the photographed image as the URL accessed by the portable terminal device 4, for example, as the latest history of the browser. In the case where the photographed image includes only one two-dimensional code 53, the portable terminal device 4 (browser) updates a URL 55 extracted from the two-dimensional code 53 as the URL accessed by the portable terminal device 4.

In step 108, the portable terminal device 4 erases, by way of image processing, the two-dimensional code including the URL 55 accessed by the browser from the MR marker 52 constituting the two-dimensional code 53, thereby recognizing the alignment marker 54 included in the MR marker 52. In one example, in the case where it is determined in step 105 that the URLs are the same, in step 108, the portable terminal device 4 erases the two-dimensional code 53 recognized in step 104 by way of image processing, thereby extracting and recognizing the alignment marker 54. In the case where it is determined in step 105 that the URLs are not the same and the URL accessed by the browser is updated to the URL 55 extracted from one of the two-dimensional codes 53 present in the photographed image, in step 108, the two-dimensional code 53 is erased by way of image processing, thereby extracting and recognizing an alignment marker 54. In step 108, the portable terminal device 4 recognizes an alignment marker 54 and calculates a coordinate transformation matrix T.

In step 109, the portable terminal device 4 determines the viewpoint position of the virtual camera in the virtual space 60 by using the calculated coordinate transformation matrix T. The viewpoint position of the virtual camera is a virtual camera position for displaying the virtual space 60 on the mixed-reality screen.

In step 110, the portable terminal device 4 obtains the virtual space data corresponding to the URL accessed by the browser from the server 3, and generates a mixed-reality image as viewed from the viewpoint position of the virtual camera. The processing proceeds to step 103 unless it is terminated, for example, due to the termination of the application (step 111).

Next, the operations and advantages of the mixed-reality system 1 according to the embodiment of the present invention will be described. In this embodiment, in the mixed-reality system 1, the MR markers 52 in which the two-dimensional codes 53 and the alignment markers 54 are integrated are disposed in the real space 50. The portable terminal device 4 loads the two-dimensional code 53 of an MR marker 52 to extract a URL 55, and executes a Web app 33 stored on the server 3 by accessing the URL 55. The portable terminal device 4 uses the two-dimensional code 53 for the identification of the MR marker 52 that has activated the Web app 33, and uses the alignment marker 54 constituting the MR marker 52 together with the two-dimensional code 53 in order to calculate the position and orientation of the portable terminal device 4.

As described above, it becomes possible for the mixed-reality system 1 to use a two-dimensional code 53 as an identification marker and to select an alignment marker used as an orientation control marker in accordance with the content of the identification marker. With this configuration, in which multi-phase code identification is performed, it becomes possible to perform recognition while suitably associating the two-dimensional code 53 and the alignment marker 54 even in the case where the photographing device 24 photographs a plurality of MR markers 52.

Furthermore, in this embodiment, the mixed-reality system 1 uses the portable terminal device 4, such as a smartphone, in which an existing two-dimensional code reader app and an existing browser are installed. Therefore, the user can experience MR more readily without having to install any special application in the portable terminal device 4.

Furthermore, in this embodiment, the mixed-reality system 1 is realized by the portable terminal device 4 accessing a Web app 33 identified by a URL 55 extracted from a two-dimensional code 53. Thus, it becomes possible with the mixed-reality system 1 to use the URL 55 as a starting point for starting an MR experience and also to use the URL 55 as a starting point for sharing the MR experience.

Furthermore, in this embodiment, the server 3 stores virtual space data for each of the URLs 55 included in the two-dimensional codes 53. For each of the MR markers 52 that are disposed, the virtual space data that is stored is virtual space data in a virtual space 60 corresponding to a real space 50 surrounding that MR marker 52. The portable terminal device 4 loads a two-dimensional code 53 and extracts a URL 55, obtains virtual space data stored on the server 3 by accessing the URL 55, and generates a mixed-reality image as viewed from viewpoint of a virtual camera by using the obtained data. Since the mixed-reality system 1 is thus configured and makes it possible to perform recognition while suitably associating a two-dimensional code 53 and an alignment marker 54, as described above, the mixed-reality system 1 makes it possible for a user to experience MR in accordance with that place for each MR marker 52 that is disposed.

Furthermore, in this embodiment, the portable terminal device 4 obtains virtual space data corresponding to a URL 55 included in a two-dimensional code 53, and recognizes an alignment marker 54 constituting the MR marker 52 together with the two-dimensional code 53. Then, the portable terminal device 4 determines the viewpoint position of a virtual camera in a virtual space 60, corresponding to the position and photographing direction of the photographing device 24 in the real space 50 on the basis of a positional relationship between the portable terminal device 4 and the alignment marker 54, which is determined from the position information contained in the URL 55 included in the two-dimensional code 53, as well as the shape and size of the alignment marker 54. With this configuration, it becomes possible to provide a user with a mixed-reality space with high accuracy, in which a real object in the real space 50 and a virtual object contact each other almost correctly.

Furthermore, in this embodiment, the portable terminal device 4 checks whether or not a URL 55 extracted from a newly recognized two-dimensional code 53 after a Web app 33 is activated is the same as a URL 55 accessed by the browser. In the case where it is determined that these URLs 55 are not the same, the portable terminal device 4, instead of reloading an MR experiencing page 34, updates the URL 55 extracted from the newly recognized two-dimensional code 53 as the URL accessed by the portable terminal device 4, for example, as the latest history of the browser. The portable terminal device 4 recognizes an alignment marker 54 constituting an MR marker 52 together with the two-dimensional code 53 including the URL 55, and determines the viewpoint position of a virtual camera in the virtual space 60 by using a coordinate transformation matrix T calculated accordingly. The portable terminal device 4 obtains the virtual space data corresponding to the updated URL 55 from the server 3, and generates a mixed-reality image as viewed from the viewpoint position of the virtual camera by using the obtained virtual space data.

With this configuration, it becomes possible for the portable terminal device 4 to perform "roaming processing", in which an MR marker 52 that first serves as a reference is set and in which the MR marker 52 that serves as the reference is changed when the photographing device 24 recognizes a two-dimensional code 53 in another MR marker 52 as a result of movement of the user. In this "roaming processing", the portable terminal device 4 uses a two-dimensional code 53 for the identification of a MR marker 52 after a Web app 33 is activated. This makes it possible to continuously provide an MR experience to a user moving in the real space 50. Furthermore, since the URL 55 is dynamically rewritten at this time instead of reloading an MR experiencing page 34, it becomes possible to continuously provide an MR experience seamlessly to a user moving in the real space 50.

Furthermore, in this embodiment, the server 3 accepts an access from the portable terminal device 4 via a URL 55, and another terminal device obtains an MR movie or the like displayed in the display area of an MR experiencing page 34 displayed by the portable terminal device 4, for example, by accessing the server 3. With this configuration, it becomes possible for the user of the portable terminal device 4 to share the sense of mixed reality that the user experiences with other users, for example, by posting a URL that enables access to the MR movie or the like on an SNS. Recently, there are many Web users, SNS users in particular, who use smartphones. Since the mixed-reality system 1 provides a system for sharing an experience of a sense of mixed reality by using an existing Web system, as described above, which has not hitherto been practiced, it becomes possible to use an MR system more readily and more generally.

As described above, the mixed-reality system 1 realizes a system that makes it possible to utilize a URL 55 as a starting point for starting, viewing, and sharing an MR experience. This makes it possible for a user to more readily experience an MR in accordance with the place where the user is.

The operations and advantages described above also apply to other embodiments and other examples unless otherwise specifically mentioned.

Another embodiment of the present invention may be a computer-readable storage medium storing a program for realizing the functions or the information processing shown in the flowchart in the above-described embodiment of the present invention. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine for realizing the functions or the information processing shown in the flowchart in the above-described embodiment of the present invention.

Modifications of the embodiments of the present invention will be described below. It is possible to apply the modifications described below, in combination with each other as appropriate, to any embodiment of the present invention as long as no inconsistency arises.

Figure 11:
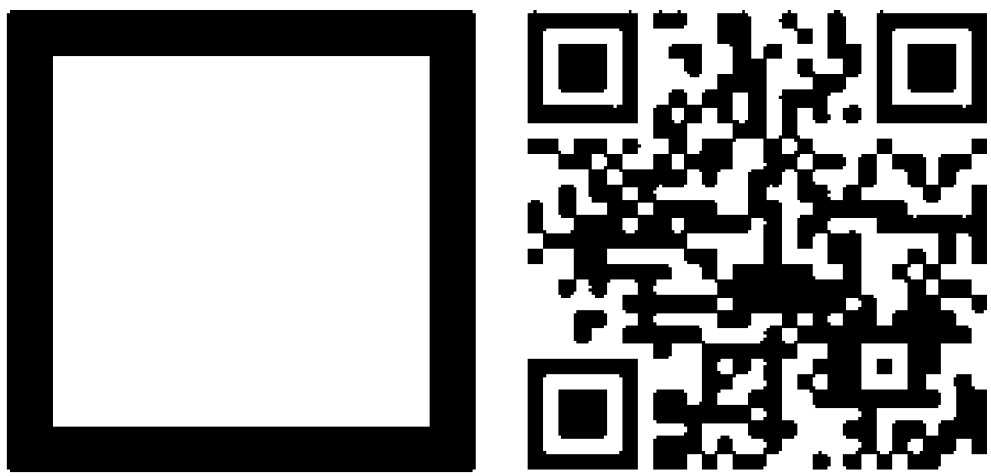
FIG. 11 shows a modification of the MR marker.

In one example, an MR marker 52 is constituted of an identification code 53 and an alignment marker 54 that has a polygonal shape and that is disposed in proximity to the identification code 53 at a position having a predetermined positional relationship with the identification code 53. FIG. 11 shows a modification of the MR marker 52. In this modification, the alignment marker 54 has a square shape and is disposed adjacent to the identification code 53, and the marker recognition unit 45 is able to recognize the alignment marker 54 from the image of the MR marker 52 as is. In this case, when an identification code 53 is newly recognized by the second identification-code recognition unit 43, the marker recognition unit 45 recognizes an alignment marker 54 disposed at a position having the predetermined positional relationship with the identification code 53.

In one example, in the case where it is determined that the identifiers are not the same, the identifier checking unit 44 further checks whether the position information contained in the identifier 55 included in the newly recognized identification code 53 is within a predetermined distance range with the position information contained in the identifier 55 accessed by the browser unit 42. In the case where the predetermined distance range is not satisfied, the browser unit 42 does not access the identifier 55 included in the identification code 53 newly recognized by the second identification-code recognition unit 43, and the marker recognition unit 45 does not recognize the alignment marker 54 included in the MR marker 52 constituting the identification code 53.

In the processing or operation described above, the processing or operation may be modified freely as long as no inconsistency arises in the processing or operation, such as an inconsistency that a certain step utilizes data that could not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 Mixed-reality system
2 Network
3 Server
4 Portable terminal device
11 Processor
12 Display device
13 Input device
14 Storage device
15 Communication device
16 Bus
21 Processor
22 Display device
23 Input device
24 Photographing device
25 Storage device
26 Communication device
27 Bus
31 Virtual-space-data storage unit
32 Application storage unit
41 First identification-code recognition unit
42 Browser unit
43 Second identification-code recognition unit
44 Identifier checking unit
45 Marker recognition unit
46 Position determination unit
47 Image generation unit 50 Real space
51 Desk
52 MR marker
53 Identification code
54 Alignment marker
55 Identifier

The invention claimed is:

1. A mixed-reality system comprising:
a server and a portable terminal device,
wherein the portable terminal device comprises a display for displaying a virtual object to a user present in a predetermined real space and a photographing device that photographs the predetermined real space,
wherein the mixed-reality system serves to display, on the display, a mixed-reality image that superimposes the virtual object on a photographed image of the predetermined real space,
wherein an MR marker constituted of an identification code containing position information corresponding to a position and an alignment marker having a polygonal shape is disposed at each of one or more predefined positions on a real object present in the predetermined real space,
wherein the portable terminal device is configured to access a mixed-reality-image displaying webpage in response to photographing an identifier within the identification code in the MR marker, the identifier being associated with a predetermined URL,
wherein the server comprises:
a virtual-space-data storage unit that stores first virtual space data including three-dimensional space data of the real object present in the predetermined real space, the three-dimensional space data being obtained in advance and constituted of three-dimensional shape elements each having three-dimensional position information in a virtual space, and including data of the virtual object disposed in the virtual space, and
an application storage unit that stores a Web application identified on the basis of based on the identifier included in the identification code, the Web application providing the mixed-reality-image displaying webpage, the mixed-reality-image displaying webpage causing the photographing device to be activated when loaded by the portable terminal device and including a display area of the mixed-reality image based on the photographed image of the predetermined real space photographed by the photographing device; and
wherein the portable terminal device further comprises:
a browser unit that accesses the identifier included in the identification code to display the mixed-reality-image displaying webpage provided by the Web application,
a marker recognition unit that recognizes the alignment marker constituting the MR marker in the case where the Web application is activated, the MR marker is photographed by the photographing device, and the identification code is recognized,
a position determination unit that determines a viewpoint position of a virtual camera in the virtual space corresponding to the position and photographing direction of the photographing device in the predetermined real space based on the position information and a positional relationship between the portable terminal device and the alignment marker recognized by the marker recognition unit, the positional relationship being determined from a shape and a size of the alignment marker, and
an image generation unit that generates the mixed-reality image in which the virtual object is superimposed on the photographed image of the predetermined real space based on the first virtual space data and the viewpoint position of the virtual camera.

2. The mixed-reality system according to claim 1,
wherein the portable terminal device comprises:
an identification-code recognition unit that recognizes the identification code in the case where the MR marker is photographed by the photographing device; and
wherein the browser unit accesses the identifier included in the identification code recognized by the identification-code recognition unit to display the mixed-reality-image displaying webpage provided by the Web application.

3. The mixed-reality system according to claim 1,
wherein the virtual-space-data storage unit stores second virtual space data corresponding to each of a plurality of identifiers included in a plurality of identification codes,
wherein the browser unit obtains the second virtual space data corresponding to the plurality of identifiers from the virtual-space-data storage unit, and
wherein the image generation unit generates the mixed-reality image as viewed from the viewpoint position of the virtual camera by using the second virtual space data obtained from the virtual-space-data storage unit.

4. The mixed-reality system according to claim 3,
wherein the portable terminal device further comprises an identifier checking unit that checks whether or not the identifier included in the identification code recognized as a result of the activation of the Web application is the same as an accessed identifier accessed by the browser unit, and
wherein the marker recognition unit recognizes the alignment marker in the case where in response to determining by the identifier checking unit that the plurality of identifiers are the same.

5. The mixed-reality system according to claim 4,
wherein, in response to determining by the identifier checking unit that the plurality of identifiers are not the same, the browser unit accesses another identifier included in the identification code recognized as a result of the activation of the Web application, obtains the second virtual space data corresponding to the other identifier from the virtual-space-data storage unit, and displays the mixed-reality-image displaying page instead of performing reloading, and
wherein the marker recognition unit recognizes the alignment marker constituting the MR marker together with the identification code including the other identifier.

6. The mixed-reality system according to claim 1, wherein the identifier is a URL.

7. The mixed-reality system according to claim 1, wherein the three-dimensional shape elements are meshes each constituted of a polygon or polygons.

8. The mixed-reality system according to claim 1, wherein the identification code is a QR code (registered trademark) or a data matrix.

9. The mixed-reality system according to claim 1, wherein the alignment marker has a square shape.

10. The mixed-reality system according to claim 1, wherein the alignment marker is disposed along an edge of the identification code.

11. The mixed-reality system according to claim 10, wherein the marker recognition unit recognizes the alignment marker by painting and erasing the identification code with a predefined color.

12. The mixed-reality system according to claim 1, wherein the alignment marker is disposed in proximity to the identification code at a position having a predetermined positional relationship with the identification code.

13. The mixed-reality system according to claim 1, wherein the portable terminal device is configured so as to be able to send, to the server, each of the photographed image of the predetermined real space photographed by the photographing device and image data of the virtual object, constituting the mixed-reality image generated by the image generation unit, so that another terminal device can obtain the mixed-reality image.

14. The mixed-reality system according to claim 1, wherein the mixed-reality-image displaying webpage comprises HTML code or Javascript code that is used to superimpose the photographed image with the virtual object to produce the mixed-reality image in the portable terminal device.

15. A non-transitory computer readable medium storing a program for a mixed-reality system comprising a portable terminal device having a display for displaying a virtual object to a user present in a predetermined real space and a photographing device that photographs the predetermined real space, the mixed-reality system serving to display, on the display, a mixed-reality image that superimposes the virtual object on a photographed image of the predetermined real space,
wherein in the mixed-reality system, an MR marker constituted of an identification code containing position information corresponding to a position and an alignment marker having a polygonal shape is disposed at each of one or more predefined positions on a real object present in the predetermined real space,
wherein the portable terminal device is configured to access a mixed-reality-image displaying webpage in response to photographing an identifier within the identification code in the MR marker, the identifier being associated with a predetermined URL, and
wherein virtual space data including three-dimensional space data of the real object present in the predetermined real space is stored on a server, the three-dimensional space data being obtained in advance and constituted of three-dimensional shape elements each having three-dimensional position information in a virtual space, and also including data of the virtual object disposed in the virtual space,
wherein a Web application identified based on an identifier included in the identification code is stored on the server, the Web application provides the mixed-reality-image displaying webpage, and the mixed-reality-image displaying webpage causes the photographing device to be activated when loaded by the portable terminal device and includes a display area of a mixed-reality image based on the photographed image of the predetermined real space photographed by the photographing device, and
wherein the program causes the portable terminal device to execute:
a step of recognizing the identification code in the case where the photographing device is activated and the MR marker is photographed by the photographing device, thereby activating a browser and accessing the identifier included in the recognized identification code to display the mixed-reality-image displaying webpage;
a step of recognizing the alignment marker constituting the MR marker in the case where the Web application is activated, the MR marker is photographed by the photographing device, and the identification code is recognized;
a step of determining a viewpoint position of a virtual camera in the virtual space corresponding to the position and photographing direction of the photographing device in the predetermined real space based on a positional relationship between the portable terminal device and the recognized alignment marker, the positional relationship being determined from a shape and a size of the alignment marker and position information contained in the identifier included in the identification code; and
a step of generating the mixed-reality image in which the virtual object is superimposed on the photographed image of the predetermined real space based on the virtual space data and the viewpoint position of the virtual camera.

16. A method that is executed by a mixed-reality system including a portable terminal device having a display for displaying a virtual object to a user present in a predetermined real space and a photographing device that photographs the predetermined real space, the mixed-reality system serves to display, on the display, a mixed-reality image that superimposes the virtual object on a photographed image of the predetermined real space,
wherein, in the mixed-reality system, an MR marker constituted of an identification code containing position information corresponding to a position and an alignment marker having a polygonal shape is disposed at each of one or more predefined positions on a real object present in the predetermined real space,
wherein the portable terminal device is configured to access a mixed-reality-image displaying webpage in response to photographing an identifier within the identification code in the MR marker, the identifier being associated with a predetermined URL, and
wherein virtual space data including three-dimensional space data of the real object present in the predetermined real space is stored on a server, the three-dimensional space data being obtained in advance and constituted of three-dimensional shape elements each having three-dimensional position information in a virtual space, and including data of the virtual object disposed in the virtual space,
wherein a Web application identified based on an identifier included in the identification code is stored on the server, the Web application provides the mixed-reality-image displaying webpage, and the mixed-reality-image displaying webpage causes the photographing device to be activated when loaded by the portable terminal device and includes a display area of a mixed-reality image based on the photographed image of the predetermined real space photographed by the photographing device,
the method comprising:
a step of recognizing the identification code in the case where the photographing device is activated and the MR marker is photographed by the photographing device, thereby activating a browser and accessing the identifier included in the recognized identification code to display the mixed-reality-image displaying webpage;

a step of recognizing the alignment marker constituting the MR marker in the case where the Web application is activated, the MR marker is photographed by the photographing device, and the identification code is recognized;

a step of determining a viewpoint position of a virtual camera in the virtual space corresponding to the position and photographing direction of the photographing device in the predetermined real space based on a positional relationship between the portable terminal device and the alignment marker, the positional relationship being determined from a shape and a size of the alignment marker, and position information contained in the identifier included in the identification code; and a step of generating the mixed-reality image in which the virtual object is superimposed on the photographed image of the predetermined real space based on the virtual space data and the viewpoint position of the virtual camera.

17. A portable terminal device in a mixed-reality system including a server and the portable terminal device, the portable terminal device comprising:

a display for displaying a virtual object to a user present in a predetermined real space; and a photographing device that photographs the predetermined real space, wherein the mixed-reality system serves to display, on the display, a mixed-reality image that superimposes the virtual object on a photographed image of the predetermined real space, wherein, in the mixed-reality system, an MR marker constituted of an identification code containing position information corresponding to a position and an alignment marker having a polygonal shape is disposed at each of one or more predefined positions on a real object present in the predetermined real space, wherein the portable terminal device is configured to access a mixed-reality-image displaying webpage in response to photographing an identifier within the identification code in the MR marker, the identifier being associated with a predetermined URL, wherein virtual space data including three-dimensional space data of the real object present in the predetermined real space is stored on the server, the three-dimensional space data being obtained in advance and constituted of three-dimensional shape elements each having three-dimensional position information in a virtual space, and including data of the virtual object disposed in the virtual space, wherein a Web application identified based on an identifier included in the identification code is stored, the Web application provides the mixed-reality-image displaying webpage, and the mixed-reality-image displaying webpage causes the photographing device to be activated when loaded by the portable terminal device and includes a display area of a mixed-reality image based on the photographed image of the predetermined real space photographed by the photographing device, the portable terminal device further comprising:

a browser unit that accesses the identifier included in the identification code to display the mixed-reality-image displaying webpage provided by the Web application;

a marker recognition unit that recognizes the alignment marker constituting the MR marker in the case where the Web application is activated, the MR marker is photographed by the photographing device, and the identification code is recognized;

a position determination unit that determines a viewpoint position of a virtual camera in the virtual space corresponding to the position and photographing direction of the photographing device in the predetermined real space based on the position information and a positional relationship between the portable terminal device and the alignment marker recognized by the marker recognition unit, the positional relationship being determined from a shape and a size of the alignment marker; and an image generation unit that generates the mixed-reality image in which the virtual object is superimposed on the photographed image of the predetermined real space based on the virtual space data and the viewpoint position of the virtual camera.

* * * * *